United States Patent
Park et al.

(10) Patent No.: US 9,312,901 B2
(45) Date of Patent: Apr. 12, 2016

(54) APPARATUS AND METHOD FOR SETTING UP AN INTERFACE IN MOBILE TERMINAL

(71) Applicant: Samsung Electronics Co., Ltd., Gyeonggi-do (KR)

(72) Inventors: Seung-Kwon Park, Gyeongsangbuk-do (KR); Hyun-Soo Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 61 days.

(21) Appl. No.: 13/853,846

(22) Filed: Mar. 29, 2013

(65) Prior Publication Data

US 2013/0260832 A1 Oct. 3, 2013

(30) Foreign Application Priority Data

Mar. 30, 2012 (KR) .................. 10-2012-0033229

(51) Int. Cl.
*H04B 1/38* (2015.01)
*H04M 3/00* (2006.01)
*H04B 1/3816* (2015.01)
*H04W 8/18* (2009.01)

(52) U.S. Cl.
CPC ............. *H04B 1/3816* (2013.01); *H04W 8/183* (2013.01)

(58) Field of Classification Search
USPC .......................... 455/418, 419, 420, 558, 566
See application file for complete search history.

(56) References Cited

U.S. PATENT DOCUMENTS

| | | | |
|---|---|---|---|
| 7,277,701 B2 * | 10/2007 | Almgren .................... | 455/432.3 |
| 7,769,371 B1 * | 8/2010 | Lamb et al. ................. | 455/420 |
| 2004/0214560 A1 * | 10/2004 | Date et al. .................... | 455/418 |
| 2006/0199613 A1 * | 9/2006 | Almgren ....................... | 455/558 |
| 2007/0259678 A1 * | 11/2007 | Kuk et al. ..................... | 455/466 |
| 2009/0258681 A1 * | 10/2009 | Kishida et al. ............... | 455/566 |
| 2010/0175062 A1 | 7/2010 | Kim | |
| 2012/0129513 A1 * | 5/2012 | van der Laak ............... | 455/419 |
| 2012/0276872 A1 * | 11/2012 | Knauth et al. ............... | 455/411 |

* cited by examiner

*Primary Examiner* — Nguyen Vo
(74) *Attorney, Agent, or Firm* — Cha & Reiter, LLC.

(57) ABSTRACT

There are provided an interface setup apparatus and method capable of easily setting up an interface in a mobile terminal. A controller transmits, to a server, identification information extracted from a Subscriber Identification Module (SIM) card inserted into the mobile terminal upon power-on of the mobile terminal, in response, downloads a binary received from the server and corresponding to the identification information, and sets up the interface of the mobile terminal based on the binary.

18 Claims, 3 Drawing Sheets

APPARATUS AND METHOD FOR SETTING UP AN INTERFACE IN MOBILE TERMINAL

CLAIM OF PRIORITY

This application claims the benefit under 35 U.S.C. §119 (a) of a Korean Patent Application filed in the Korean Intellectual Property Office on Mar. 30, 2012 and assigned Serial No. 10-2012-0033229, the entire disclosure of which is incorporated herein by reference.

BACKGROUND OF THE INVENTION

1. Field of the Invention

The present invention relates generally to an apparatus and method for setting up an interface in a mobile terminal, and more particularly, to an apparatus and method capable of easily setting up an interface in a mobile terminal.

2. Description of the Related Art

In general, different communication service providers (or operators) implement different interfaces for mobile terminals. To this end, manufacturers set up different interfaces that are unique to each operator or region in mobile terminals which is known as 'localization of mobile terminals' in the field of mobile communication.

For the localization of mobile terminals, the manufacturers may generate individual binaries including custom-made data, to which requirements of countries/operators are applied, and store the binaries in their associated mobile terminals, thereby installing a binary corresponding to a specific country/operator in its associated mobile terminal. In this method, however, if an error occurs in custom-made data for a specific country/operator, its associated binary must be newly generated, making it cumbersome to the manufacturers. In addition, because the interface of a mobile terminal is set with custom-made data unique to a specific country/operator during a manufacturing process, the mobile terminal may not be used in other countries or for other operators.

SUMMARY OF THE INVENTION

An aspect of an exemplary embodiment of the present invention is to provide an interface setup apparatus and method capable of easily setting up an interface in a mobile terminal.

Another aspect of an exemplary embodiment of the present invention is to provide an interface setup apparatus and method for eliminating the need to generate and store binaries including custom-made data, to which requirements of countries/operators are applied, during a manufacturing process of mobile terminals.

Another aspect of an exemplary embodiment of the present invention is to provide an interface setup apparatus and method capable of improving memory efficiency of a mobile terminal.

In accordance with one aspect of the present invention, an apparatus for setting up an interface in a mobile terminal includes a controller for transmitting, to a server, identification information extracted from a Subscriber Identification Module (SIM) card inserted into the mobile terminal upon power-on of the mobile terminal, downloading a binary corresponding to the identification information received from the server, and setting up the interface of the mobile terminal based on the binary.

In accordance with another aspect of the present invention, a method for setting up an interface in a mobile terminal includes transmitting identification information extracted from the mobile terminal to a server upon power-on of the mobile terminal; and downloading a binary corresponding to the identification information received from the server, and setting up the interface of the mobile terminal based on the binary.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. For simplicity, descriptions of well-known functions and constructions are omitted for clarity and conciseness.

Figure 1:
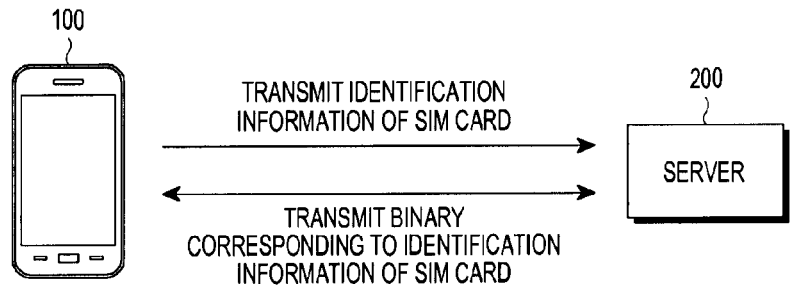
FIG. 1 shows an exchange of information between a mobile terminal and a server for setting up an interface of the mobile terminal.

FIG. 1 shows an exchange of information between a mobile terminal and a server for setting up an interface of the mobile terminal.

Referring to FIG. 1, a mobile terminal 100 may include a common binary that is needed for mobile terminals regardless of the country and/or operator, and an application for server access.

In operation, the mobile terminal 100, upon power-on, extracts a country code (e.g., Mobile Country Code (MCC)) and an operator code (e.g., Mobile Network Code (MNC)) from a Subscriber Identification Module (SIM) card inserted into the mobile terminal 100 as identification information, and transmits the extracted MCC and MNC to a server 200. Upon receiving a binary corresponding to the identification information of the SIM card from the server 200, the mobile terminal 100 downloads the received binary and sets up its interface based on the binary.

The server 200 stores in advance binaries corresponding to identification information including MCCs and MNCs. Upon receiving identification information from the mobile terminal 100, the server 200 detects a binary corresponding to the received identification information and transmits the detected binary to the mobile terminal 100.

The binary corresponding to the identification information includes custom-made data unique to a country and an operator. As such, the mobile terminal 100 sets up an interface thereof depending on identification information including an MCC and an MNC. The custom-made data includes at least one of an Access Point Name (APN) profile, E-mail setting information, a homepage address, power-on/off images, a background image, a ringtone, applications, menu setting information, widgets, network lock setting information, and activation setting information.

Figure 2:
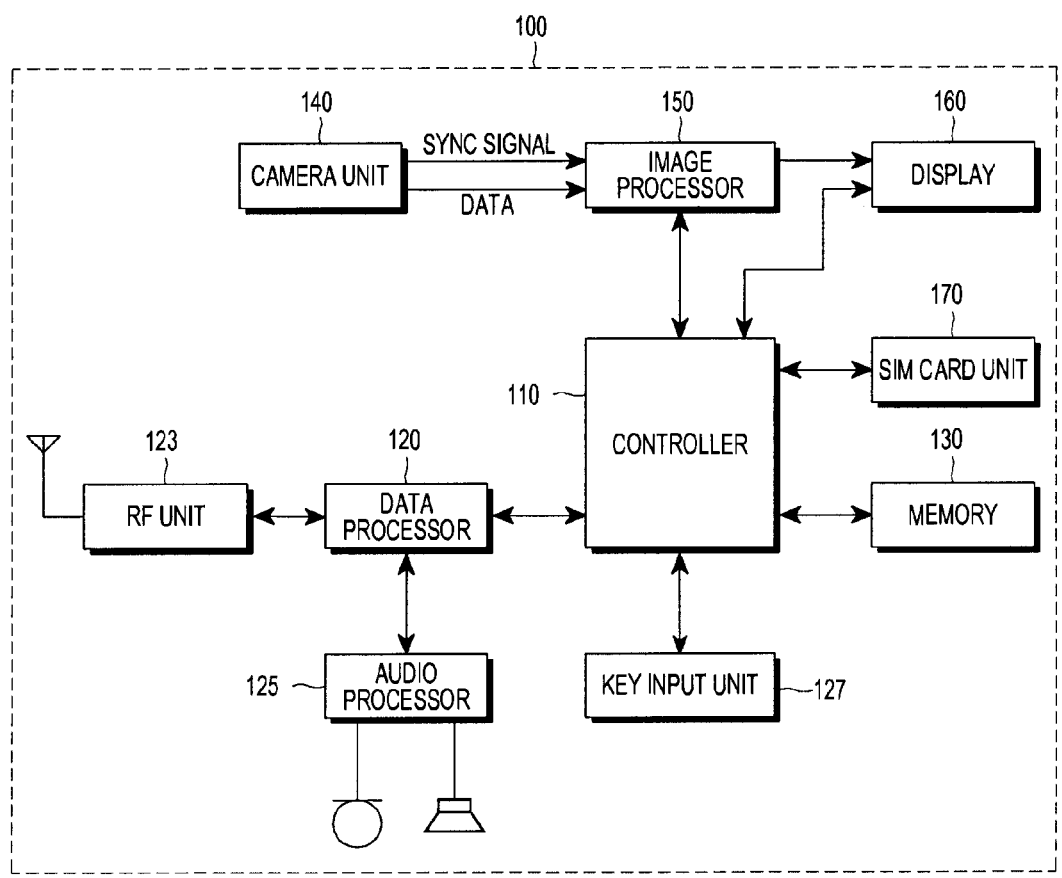
FIG. 2 shows a structure of a mobile terminal according to an embodiment of the present invention.

FIG. 2 shows a structure of a mobile terminal 100 according to an embodiment of the present invention.

Referring to FIG. 2, a Radio Frequency (RF) unit 123 is responsible for wireless communication of the mobile terminal 100. To achieve this, the RF unit 123 includes an RF transmitter for up-converting a frequency of transmission signals and amplifying the up-converted transmission signals, and an RF receiver for low-noise-amplifying received signals and down-converting a frequency of the amplified received signals.

A data processor 120 includes a transmitter for coding and modulating the transmission signals, and a receiver for demodulating and decoding the received signals. To this end, the data processor 120 may include a modulator/demodulator (modem) and a coder/decoder (codec). The codec includes a data codec for processing data signals such as packet data, and an audio codec for processing audio signals such as voice. An audio processor 125 plays received audio signals output from the audio codec in the data processor 120 using a speaker SPK, and transfers transmission audio signals picked up by a microphone MIC to the audio codec in the data processor 120.

A key input unit 127 includes alphanumeric keys for inputting alphanumeric information, and function keys for setting various functions.

A memory 130 may include a program memory and a data memory. The program memory may store programs for controlling the overall operation of the mobile terminal 100, and programs for setting up an interface of the mobile terminal 100 based on a binary received from the server 200 and corresponding to identification information of a SIM card inserted into the mobile terminal 100 according to an embodiment of the present invention. The data memory may temporarily store the data generated during execution of the programs.

In accordance with an embodiment of the present invention, the memory 130 may store a common binary and an application for server access.

A controller 110 controls an overall operation of the mobile terminal 100.

In accordance with an embodiment of the present invention, the controller 110 determines whether a SIM card is inserted into the mobile terminal 100 upon power-on of the mobile terminal 100, and determines whether an application for server access is present in the mobile terminal 100 when the SIM card is inserted into the mobile terminal 100. If the application for server access is present in the mobile terminal 100, the controller 110 accesses the server 200 by running the application for server access, and transmits identification information extracted from the SIM card to the server 200. Only the common binary and the application for server access may be stored in the mobile terminal 100 during a manufacturing process.

The controller 110 displays a SIM card insertion request message if no SIM card is inserted into the mobile terminal 100.

Further, the controller 110 determines whether the SIM card is inserted into the mobile terminal 100, upon power-on of the mobile terminal 100, and determines whether only the common binary is present in the mobile terminal 100 when the SIM card is inserted into the mobile terminal 100. Here, the controller 110 may display a SIM card insertion request message if no SIM card is inserted into the mobile terminal 100. If only the common binary is present in the mobile terminal 100, the controller 110 automatically accesses the server 200, and transmits identification information extracted from the SIM card to the server 200. Note that only the common binary may be stored in the mobile terminal 100 during a manufacturing process.

The controller 110 receives a binary corresponding to a country and an operator associated with the mobile terminal 100 from the server 200 based on the identification information of the SIM card inserted into the mobile terminal 100. The controller 110 extracts an MCC and an MNC from an International Mobile Subscriber Identity (IMSI) of the SIM card, as the identification information.

Upon receiving a binary corresponding to the identification information of the SIM card from the server 200, the controller 110 downloads the received binary, and upon completion of downloading the binary, reboots the mobile terminal 100 and sets up an interface thereof based on the binary.

Upon insertion of the SIM card, a SIM card unit 170 transfers identification information of the SIM card to the controller 110.

A camera unit 140 includes a camera sensor for capturing image data and converting captured optical signals into electrical signals, and a signal processor for converting analog image signals captured by the camera sensor into digital data. The camera sensor is assumed to be a Charge-Coupled Device (CCD) or Complementary Metal-Oxide Semiconductor (CMOS) sensor, and the signal processor may be implemented with a Digital Signal Processor (DSP). The camera sensor and the signal processor may be implemented integrally or separately.

An image processor 150 performs Image Signal Processing (ISP) to display the image signals output from the camera unit 140 on a display 160. The ISP includes functions such as gamma correction, interpolation, spatial variation, image effecting, image scaling, Auto White Balance (AWB), Auto Exposure (AE), Auto Focus (AF), etc. The image processor 150 processes the image signals output from the camera unit 140 on a frame-by-frame basis, and outputs the frame image data according to the characteristic and size of the display 160. The image processor 150, having a video codec, compresses frame image data displayed on the display 160 using a predetermined coding scheme, and decompresses or restores the compressed frame image data to its original frame image data. The video codec may be a Joint Photographic Experts Group (JPEG) codec, a Moving Picture Experts Group 4 (MPEG4) codec, Wavelet codec, etc. When supporting the On Screen Display (OSD) future, the image processor 150 may output OSD data according to the size of the displayed screen under control of the controller 110.

The display 160 displays, on a screen, image signals output from the image processor 150 and user data output from the controller 110. The display 160 may include a Liquid Crystal Display (LCD). In this case, the display 160 may include an LCD controller, a memory capable of storing image data, and an LCD panel. When supporting the touch screen feature, the LCD may serve as an input unit. In this case, the display 160 may display the same keys as those of the key input unit 127.

An operation of setting up an interface in the above-described mobile terminal will be described in detail with reference to FIGS. 3 and 4.

Figure 3:
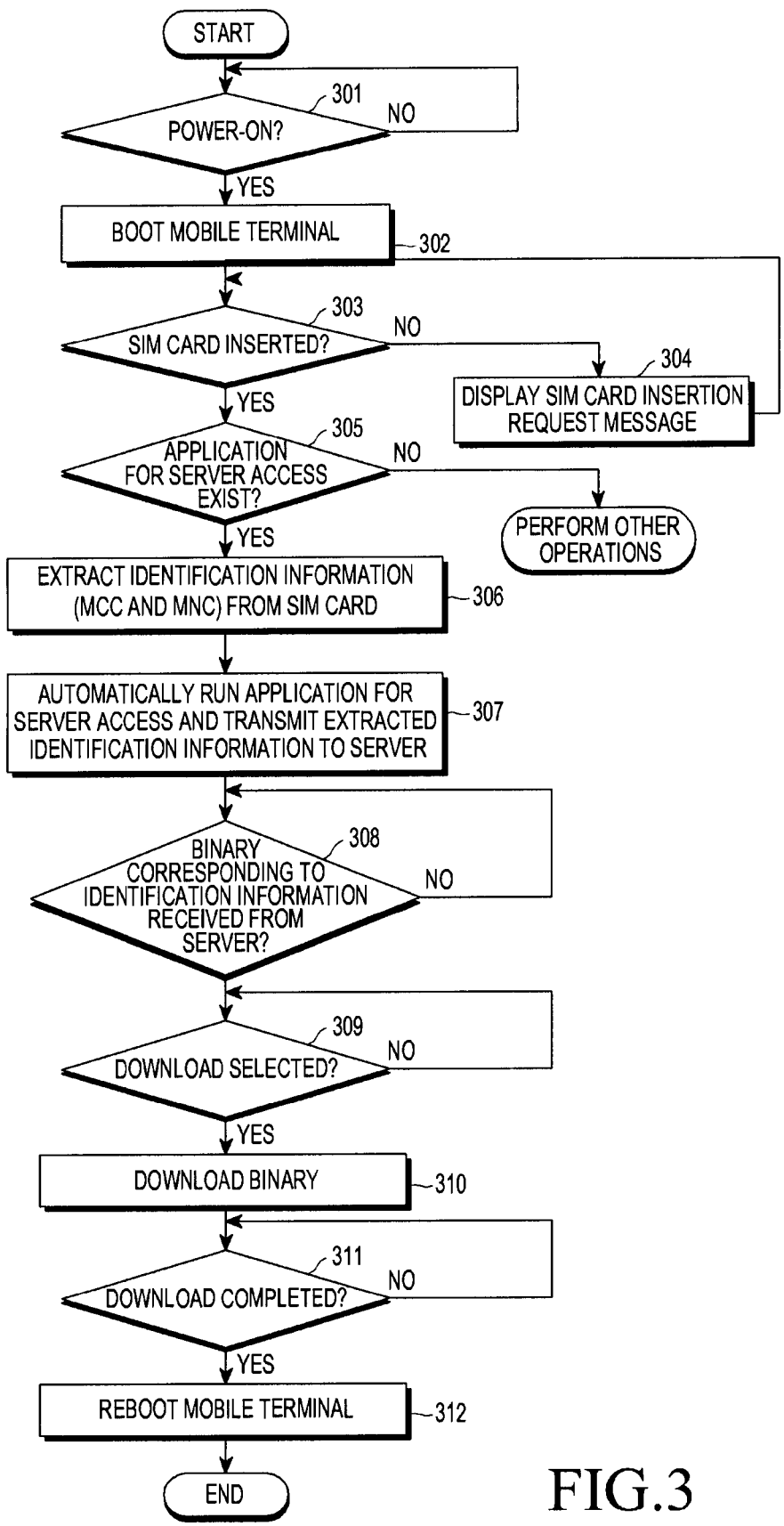
FIG. 3 shows a process of setting up an interface in a mobile terminal according to a first embodiment of the present invention.

FIG. 3 shows a process of setting up an interface in a mobile terminal according to a first embodiment of the present invention. In the first embodiment of the present invention, a mobile terminal, in which only the common binary and the application for server access are stored in a manufacturing process for mass production, will be considered by way of example.

Hereinafter, the first embodiments of the present invention will be described in detail below with reference to FIG. 3 along with FIGS. 1 and 2.

Referring to FIG. 3, upon power-on of the mobile terminal 100 in step 301, the controller 110 boots the mobile terminal 100 in step 302. After booting the mobile terminal 100, the controller 110 determines in step 303 whether a SIM card is inserted into the SIM card unit 170. If no SIM card is inserted into the SIM card unit 170, the controller 110 displays a SIM card insertion request message on the display 160 in step 304.

However, if the SIM card is inserted into the SIM card unit 170 in step 303, the controller 110 determines in step 305 whether an application for server access is present in the memory 130 of the mobile terminal 100.

If the application for server access is present in the memory 130 of the mobile terminal 100 in step 305, the controller 110 extracts an MCC and an MNC from an IMSI of the SIM card as identification information in step 306.

In step 307, the controller 110 automatically accesses the server 200 by running the application for server access and then transmits the extracted identification information of the SIM card to the server 200. In response, the server 220 extracts a binary corresponding to the identification information of the SIM card received from the mobile terminal.

Thereafter, upon receiving the binary corresponding to the identification information of the SIM card from the server 200 in step 308, the controller 110 displays a message asking whether to select 'Download', on the display 160. If 'Download' is selected by the user in step 309, the controller 110 downloads the received binary in step 310. The binary may be automatically downloaded without the user's selection.

If the download of the binary corresponding to the identification information of the SIM card is completed in step 311, the controller 110 reboots the mobile terminal 100 and sets up an interface of the mobile terminal 100 based on the received binary in step 312.

Figure 4:
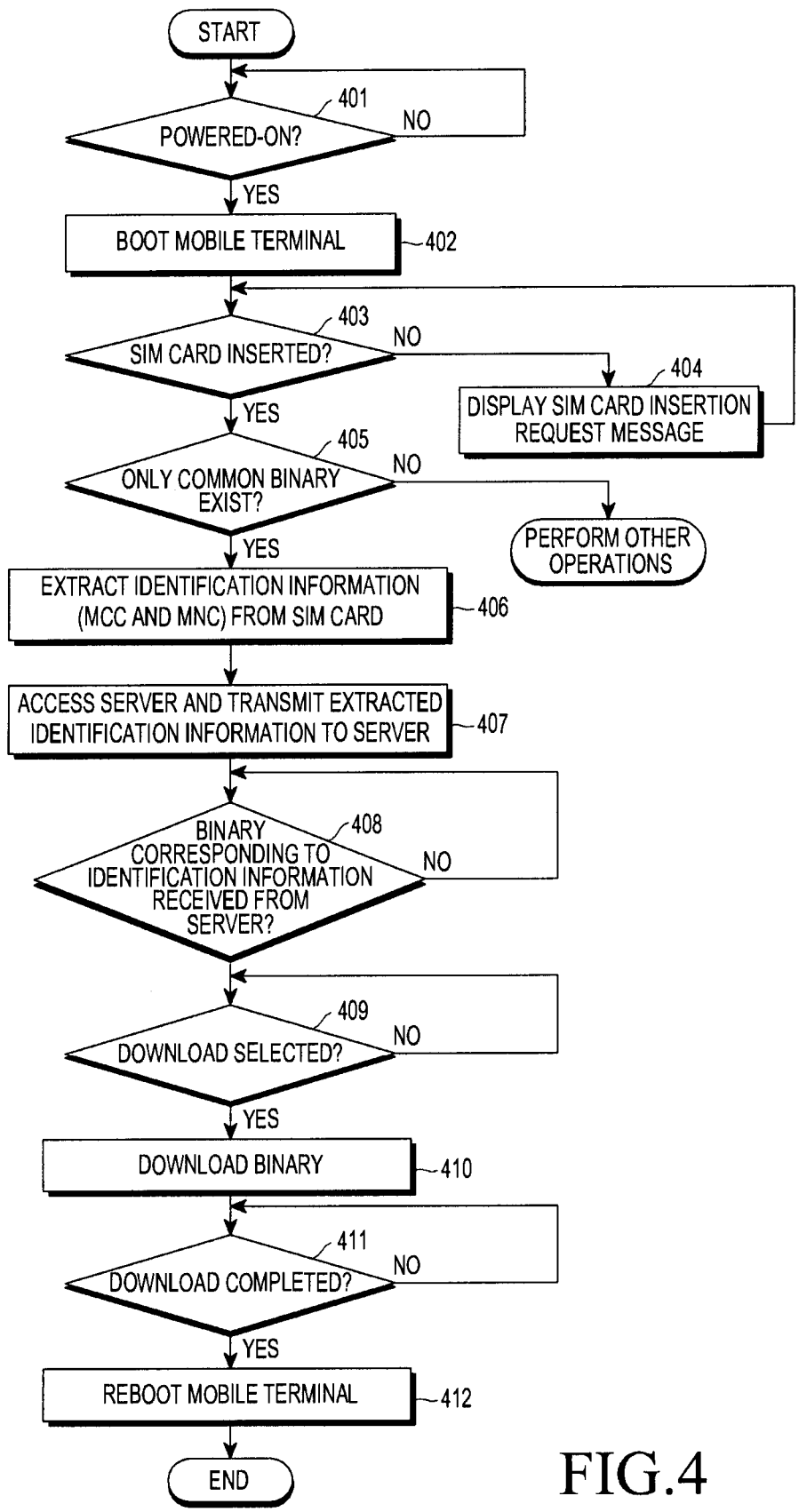
FIG. 4 shows a process of setting up an interface in a mobile terminal according to a second embodiment of the present invention.

FIG. 4 shows a process of setting up an interface in a mobile terminal according to a second embodiment of the present invention. In the second embodiment of the present invention, a mobile terminal, in which only the common binary is stored in a manufacturing process for mass production, will be considered by way of example.

Hereinafter, the second embodiments of the present invention will be described in detail below with reference to FIG. 4 along with FIGS. 1 and 2.

Referring to FIG. 4, upon power-on of the mobile terminal 100 in step 401, the controller 110 boots the mobile terminal 100 in step 402. After booting the mobile terminal 100, the controller 110 determines in step 403 whether a SIM card is inserted into the SIM card unit 170. If no SIM card is inserted into the SIM card unit 170 in step 403, the controller 110 displays a SIM card insertion request message on the display 160 in step 404.

However, if the SIM card is inserted into the SIM card unit 170 in step 403, the controller 110 determines in step 405 whether only the common binary is present in the memory 130 of the mobile terminal 100.

If only the common binary is present in the memory 130 of the mobile terminal 100 in step 405, the controller 110 extracts an MCC and an MNC from an IMSI of the SIM card as identification information in step 406.

Thereafter, in step 407, the controller 110 automatically accesses the server 200 by running the application for server access and transmits the extracted identification information of the SIM card to the server 200. In response, the server 220 extracts a binary corresponding to the identification information of the SIM card received from the mobile terminal.

Upon receiving the binary corresponding to the identification information of the SIM card from the server 200 in step 408, the controller 110 displays a message asking whether to select 'Download', on the display 160. If 'Download' is selected by the user in step 409, the controller 110 downloads the received binary in step 410. The binary may be automatically downloaded without the user's selection.

If the download of the binary corresponding to the identification information of the SIM card is completed in step 411, the controller 110 reboots the mobile terminal 100 and sets up an interface of the mobile terminal 100 based on the received binary in step 412.

The operations described with reference to FIGS. 3 and 4 are performed only in the initial boot mode after the mobile terminal 100 is mass-produced, thus making it possible to set up the interface of the mobile terminal 100 based on the binary corresponding to identification information of the SIM card inserted into the mobile terminal 100. Alternatively, the operations described with reference to FIGS. 3 and 4 are performed whenever a new SIM card is inserted into the mobile terminal 100, thereby making it possible to set up the interface of the mobile terminal 100 based on the binary corresponding to identification information of a new SIM card inserted into the mobile terminal 100.

As is apparent from the foregoing description, the proposed interface setup apparatus and method may eliminate the need to generate binaries including custom-made data, to which requirements of countries/operators are applied, during a manufacturing process of mobile terminals, and then storing the generated binaries in the mobile terminals in advance, thereby contributing to an increase in memory efficiency of the mobile terminals.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising at least one processor configured to:
   in response to detecting insertion of a Subscriber Identification Module (SIM) card to the electronic device, detect whether only a generic binary is present on the electronic device;
   if only a generic binary is present on the electronic device, retrieve a custom binary from a server based on identification information extracted from the SIM card; and
   change a configuration of an interface of the electronic device based on custom data that is contained in the custom binary,
   wherein the custom binary is selected from among a plurality of custom binaries stored in the server based on correspondence to the identification information extracted from the SIM card, and includes custom data unique to a country and an operator, and
   wherein the custom binary is associated with a particular mobile network, and the generic binary is stored on the electronic device during manufacturing of the electronic device and is not associated with any particular network.

2. The electronic device of claim 1, further comprising a memory for storing a generic binary and an application for server access.

3. The electronic device of claim 1, wherein the at least one processor is further configured to:
   detect whether an application for server access is present in the electronic device when the SIM card is inserted into the electronic device;
   wherein the custom binary is retrieved by running the application for the server access when the application for server access is present in the electronic device.

4. The electronic device of claim 3, wherein the at least one processor is further configured to display a SIM card insertion request message if no SIM card is inserted into the electronic device.

5. The electronic device of claim 1, wherein the custom binary is retrieved based on a country code and an operator code that are extracted from an International Mobile Subscriber Identity (IMSI) of the SIM card.

6. The electronic device of claim 1, wherein the at least one processor is further configured to reboot the electronic device after the interface of the electronic device is reconfigured.

7. The electronic device of claim 1, wherein the interface comprises a graphic user interface, and a configuration of the graphic user interface is changed based on the custom data to alter at least a power-on image and power-off image displayed when the electronic device is powered-on and powered-off, respectively, and a configuration of menus displayed for accessing functions of the electronic device.

8. An electronic device comprising at least one processor configured to:
   detect whether any custom binaries are present on the electronic device when a Subscriber Identification Module (SIM) card is inserted into the electronic device, the detecting including detecting whether only a generic binary is present in the electronic device; and
   when no custom binaries are present in the electronic device, retrieve, from a server, a custom binary based on a mobile network code (MNC) that is extracted from the SIM card; and
   change a configuration of an interface of the electronic device based on the custom binary,
   wherein the custom binary includes custom-made data unique to a country and an operator,
   wherein the generic binary is stored on the electronic device during a manufacturing of the electronic device and is not associated with any particular mobile network, and
   wherein the custom binary is associated with a particular mobile network.

9. The electronic device of claim 8, wherein the at least one processor is further configured to display a SIM card insertion request message if no SIM card is inserted into the electronic device.

10. A method in an electronic device, comprising:
    in response to detecting insertion of a Subscriber Identification Module (SIM) card to the electronic device, detecting whether only a generic binary is present on the electronic device;
    if only a generic binary is present on the electronic device, retrieving a custom binary from a server based on identification information extracted from the SIM card; and
    changing a configuration of an interface of an electronic device based on custom data that is contained in the custom binary;
    wherein the custom binary is selected from among a plurality of custom binaries stored in the server based on correspondence to the identification information extracted from the SIM card, and includes custom data unique to a country and an operator, and
    wherein the custom binary is associated with a particular mobile network, and the generic binary is stored on the electronic device during manufacturing of the electronic device and is not associated with any particular network.

11. The method of claim 10, wherein the electronic device stores a generic binary in a memory of the electronic device.

12. The method of claim 10, further comprising:
    detecting whether an application for server access is present in the electronic device when the SIM card is inserted into the electronic device;
    wherein the custom binary is retrieved by running the application for the server access when the application for server access is present in the electronic device.

13. The method of claim 12, further comprising displaying a SIM card insertion request message when no SIM card is inserted into the electronic device.

14. The method of claim 10, wherein the binary is retrieved based on a country code and an operator code that are extracted from an International Mobile Subscriber Identity (IMSI) of the SIM card.

15. The method of claim 10, further comprising rebooting the electronic device after the interface of the electronic device is reconfigured.

16. The method of claim 10, wherein the interface comprises a graphic user interface, and a configuration of the graphic user interface is changed based on the custom data to alter at least a power-on image and power-off image displayed when the electronic device is powered-on and powered-off, respectively, and a configuration of menus displayed for accessing functions of the electronic device.

17. A method comprising:
    detecting whether any custom binaries are present on an electronic device when a Subscriber Identification Module (SIM) card is inserted into the electronic device, the detecting including detecting whether only a generic binary is present in the electronic device; and
    in response to detecting that no custom binaries are present in the electronic device, retrieving, from a server, a custom binary, the custom binary being retrieved based on a mobile network code (MNC) that is extracted from the SIM card; and changing a configuration of an interface of the electronic device based on the custom binary,
wherein the custom binary includes custom-made data unique to a country and an operator, wherein the generic binary is stored on the electronic device during a manufacturing of the electronic device and is not associated with any particular mobile network, and wherein the custom binary is associated with a particular mobile network.

18. The method of claim 17, further comprising displaying a SIM card insertion request message when no SIM card is inserted into the electronic device.

* * * * *